(12) United States Patent
Kumada

(10) Patent No.: US 6,430,311 B1
(45) Date of Patent: Aug. 6, 2002

(54) IMAGE PROCESSING APPARATUS AND METHOD

(75) Inventor: Shuichi Kumada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/015,324

(22) Filed: Jan. 29, 1998

(30) Foreign Application Priority Data

Jan. 31, 1997 (JP) .............................................. 9-018787

(51) Int. Cl.$^7$ ................................................. G06K 9/00
(52) U.S. Cl. ...................... 382/162; 382/167; 358/1.9; 358/1.15; 358/1.16; 358/518
(58) Field of Search ................................ 382/162, 167; 358/518, 1.1, 1.6, 1.15, 504–505, 523, 500, 468, 1.9, 442, 444, 404; 395/118; 707/528; 345/431, 418, 153–155, 619, 603, 589, 604

(56) References Cited

U.S. PATENT DOCUMENTS

| | | | | |
|---|---|---|---|---|
| 4,991,108 A | * | 2/1991 | Hamilton | 358/1.6 |
| 5,634,092 A | * | 5/1997 | Stokes | 395/118 |
| 5,720,013 A | * | 2/1998 | Uda et al. | 395/114 |
| 5,724,442 A | * | 3/1998 | Ogatsu et al. | 382/167 |
| 5,806,081 A | * | 9/1998 | Swen et al. | 707/528 |
| 5,854,940 A | * | 12/1998 | Niihara | 358/1.6 |
| 5,884,014 A | * | 3/1999 | Huttenlocher et al. | 395/114 |
| 5,926,559 A | * | 7/1999 | Ohta | 382/162 |
| 6,043,909 A | * | 3/2000 | Holub | 358/504 |

FOREIGN PATENT DOCUMENTS

JP      7222009      8/1985 ............ H04N/1/60

OTHER PUBLICATIONS

ICC Profile Format Specification; Version 3.3 International Color Consortium pp. 1–5, 16–22, 72, 108–112 & Chap C, Nov. 11, 1996.*

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

The present invention relates to an image processing apparatus and method which perform a color matching process in a networked system using a profile storage for storing a plurality of profiles corresponding to devices, an image data base for storing a plurality of image files corresponding to images, color process module storage for storing a color process module, a communicator for communicating with a network client through a network, wherein the image data representing an image stored in the image data base, the color process module and a profile stored in the profile storage means are down-loaded to the network client through the communicator in accordance with a demand by the network client.

9 Claims, 17 Drawing Sheets

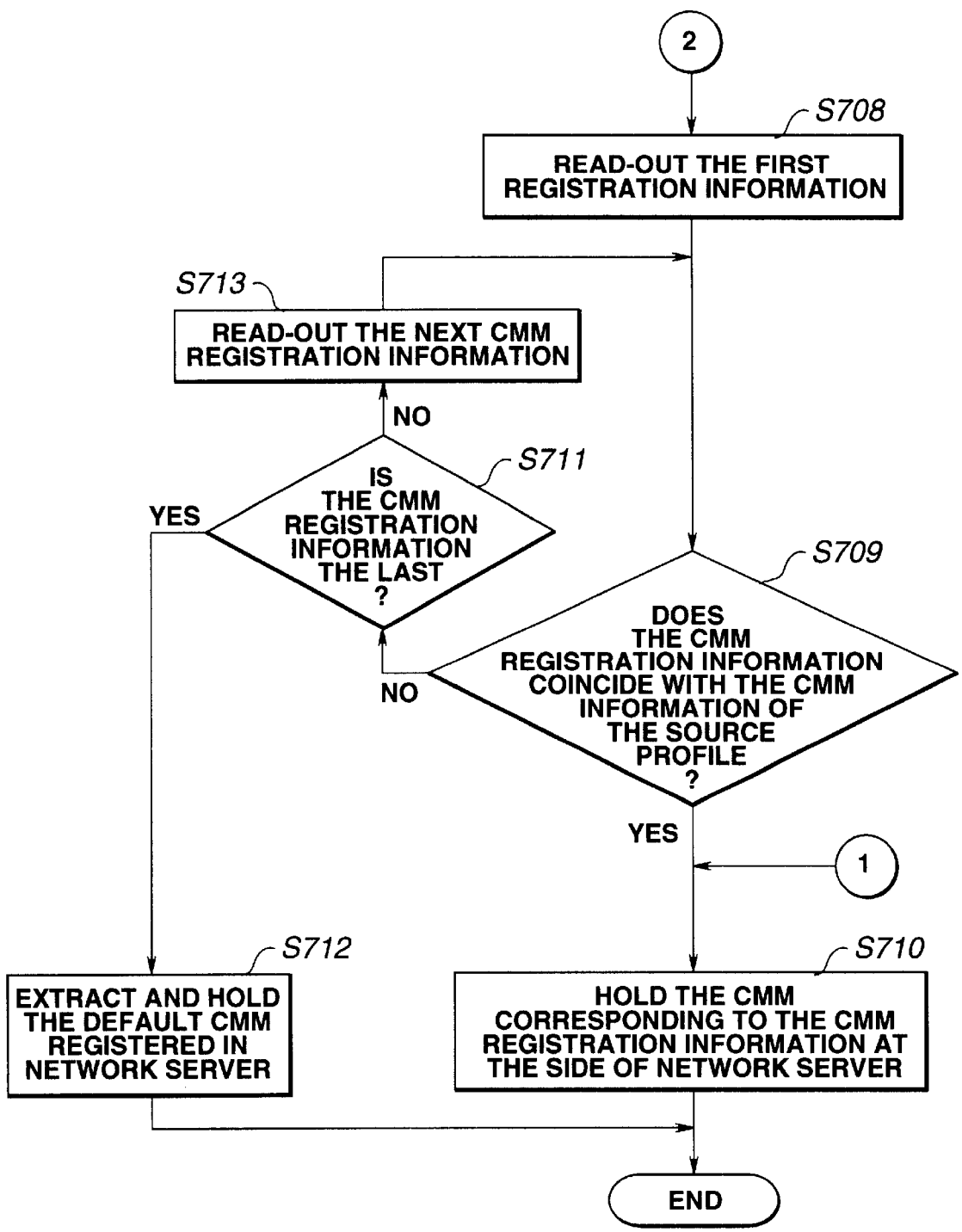

IMAGE PROCESSING APPARATUS AND METHOD

BACKGROUND OF THE INVENTION

1. Field of the Invention

This invention relates to an image processing apparatus and method which perform a color processing such as a color matching process in a network system.

2. Description of the Related Art

As is described in the specification of Japanese Laid-open 7-222009, a color management system comprises a color management module (CMM) which defines the algorithm of a color matching process and a device profile which represents the characteristic of an image processing device.

A color conversion process of the color matching process is performed to match the colors of an input image and an output image by using the profile corresponding to a source device before the conversion and the profile corresponding to a destination device after the conversion. The former profile is called a source device profile and the latter one is called a destination device profile.

For example, in the color processing shown in FIG. 1, the scanner color space (scanner RGB) or the monitor color space (monitor RGB) is converted to printer color space (printer CMYK). In this case, the source device is a scanner or a monitor, the profile of the scanner or the monitor is the source profile, the destination device is a printer and the profile of the printer is the destination profile. The image data, which is based on the scanner RGB or monitor RGB is converted to the image data based on the printer CMYK by the algorithm of the color management module. The color management module uses the source profile and the destination profile for determining the conversion characteristic.

FIG. 2 shows one example of structure of the device profile. Here, the profile includes the header part and the data storage part. In the header part, information used for managing the profile, for example, device information indicating the device (ex. monitor) which corresponds to the profile, and CMM information indicating which CMM uses the profile, is stored.

Profile description information, which is used for discriminating the profile, is stored in the data storage. For example, the profile description information may contain the manufacturer's name and the product's name.

However, conventionally above-mentioned color management was not realized in the network system. That is, the device profile or the color management module used for the color conversion could not be systematically sent or received between the transmitter side and the receiver side.

As a result, it was very difficult to realize high quality color matching in the network system efficiently.

SUMMARY OF THE INVENTION

The purpose of the present invention is to improve the color management system for applying it to the network system.

One such purpose is to use the functions of the network server and the network client efficiently for color matching process.

To achieve this purpose, for example, the present invention is an image processing apparatus which comprises profile storage means for storing a plurality of profiles corresponding to devices, an image data base for storing a plurality of image files corresponding to images, color process module storage means for storing a color process module, and communicating means for communicating with a network client through a network, wherein the image data representing an image stored in the image data base, the color process module and a profile stored in the profile storage means are down-loaded to the network client through said communicating means in accordance with a demand of the network client.

Another purpose of the present invention is to provide a new software for the network server or the network client concerning the color matching process.

To achieve this purpose, for example, the present invention is a computer program product comprising a computer usable medium having computer readable program code means embodied in the medium for causing a communication with a network client, the computer program product including, computer readable program code means for storing a plurality of profiles corresponding to devices in profile storage means, computer readable program code means for storing a plurality of image files corresponding to images in an image data base, computer readable program code means for storing a color process module in a color process module storage means and computer readable program code means for communicating with a network client through a network, wherein image data representing an image stored in the image data base, the color process module and a profile stored in the profile storage means are down-loaded to the network client through the communicating means in accordance with a demand of the network client.

The present invention is also embodied in a computer program product comprising a computer usable medium having computer readable program code means embodied in the medium for causing a communication with a network server, the computer program product includes computer readable program code means for accessing one of a plurality of profiles corresponding to devices stored in profile storage means of the network server, computer readable program code means for accessing one of a plurality of image files corresponding to images stored in an image data base of the network server, computer readable program code means for accessing a color process module stored in a color process module storage means of the network server and computer readable program code means for communicating with the network server through a network in order to down-load image data representing an image stored in the image data base, the color process module and a profile stored in the profile storage means.

Another purpose of the present invention is to provide an efficient color matching by using low-resolution image and high-resolution image corresponding to the same image.

To achieve this purpose, for example, the present invention is an image processing method used in network system, which comprises a network server, a network client and a network printer, comprising the steps of, when a color matching result is confirmed at the network client, 1) sending low-resolution data in the image file to the network client by the network server, 2) performing color matching process on the low-resolution data by the network client, and displaying a result of the color matching process by a monitor, and when image forming is performed by the network printer, 3) performing color matching process on the high-resolution data in the image file and sending the high-resolution data to the network printer by the network server.

Also the present invention is embodied in a computer program product comprising a computer usable medium having computer readable program code means embodied in the medium which is used in network system, which comprises a network server, a network client and a network printer, the computer program product including, 1) computer readable program code means for sending low-resolution data in the image file to the network client by the network server when a color matching result is confirmed at the network client, 2) computer readable program code means for performing color matching process on the low-resolution data by the network client, and displaying a result of the color matching process by a monitor when a color matching result is confirmed at the network client, and 3) computer readable program code means for performing color matching process on the high-resolution data in the image file and sending the high-resolution data to the network printer by the network server when image forming is performed by the network printer.

Another purpose of the present invention is to provide a color matching method which uses image data of a plurality of resolutions.

To achieve this purpose, for example, the present invention is an image processing method used in an image processing apparatus having an image file for storing image data of a plurality of resolutions, comprising the steps of, inputting an instruction of image forming process by using a desired image forming apparatus, inputting a profile corresponding to the image forming apparatus, judging a resolution of the image forming apparatus, reading out image data of a resolution which is the same as or higher than the resolution of the image forming apparatus and is nearest to the resolution of the image forming apparatus, converting the resolution of the read-out image data into the resolution of the image forming apparatus, performing color matching process on the converted image data by using the profile and sending the image data to the image forming means.

Also the present invention is embodied in a computer program product comprising a computer usable medium having computer readable program code means embodied in said medium which is used in an image processing apparatus having an image file for storing image data of a plurality of resolutions, the computer program product includes, computer readable program code means for inputting an instruction of image forming process by using a desired image forming apparatus, computer readable program code means for inputting a profile corresponding to the image forming apparatus, computer readable program code means for judging a resolution of the image forming apparatus, computer readable program code means for reading out image data of a resolution which is the same as or higher than the resolution of the image forming apparatus and is nearest to the resolution of the image forming apparatus, computer readable program code means for converting the resolution of the read-out image data into the resolution of the image forming apparatus, computer readable program code means for performing color matching process on the converted image data by using the profile and computer readable program code means for sending the image data to the image forming means.

BRIEF DESCRIPTION OF THE DRAWINGS

FIG. 17 is a flowchart of the detailed processing of S206 of FIG. 7.

DETAILED DESCRIPTION OF THE PREFERRED EMBODIMENT

First Embodiment

One preferred embodiment of this invention will be explained by referring to the attached drawings as follows. As will be explained below in detail, a color matching process is performed by using several components of a network system efficiently.

Figure 1:
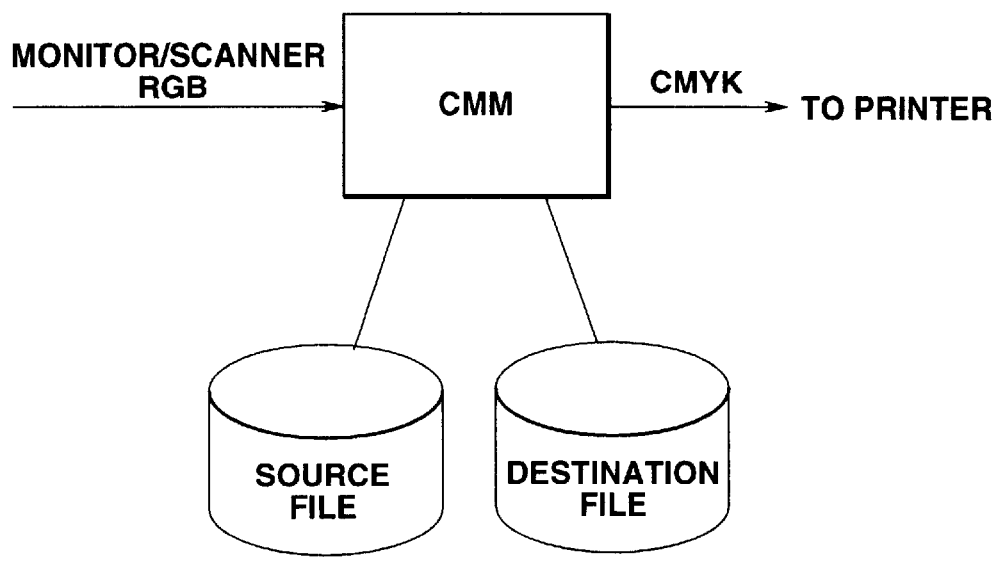
FIG. 1 shows a prior art concept of a color management system.
Figure 2:
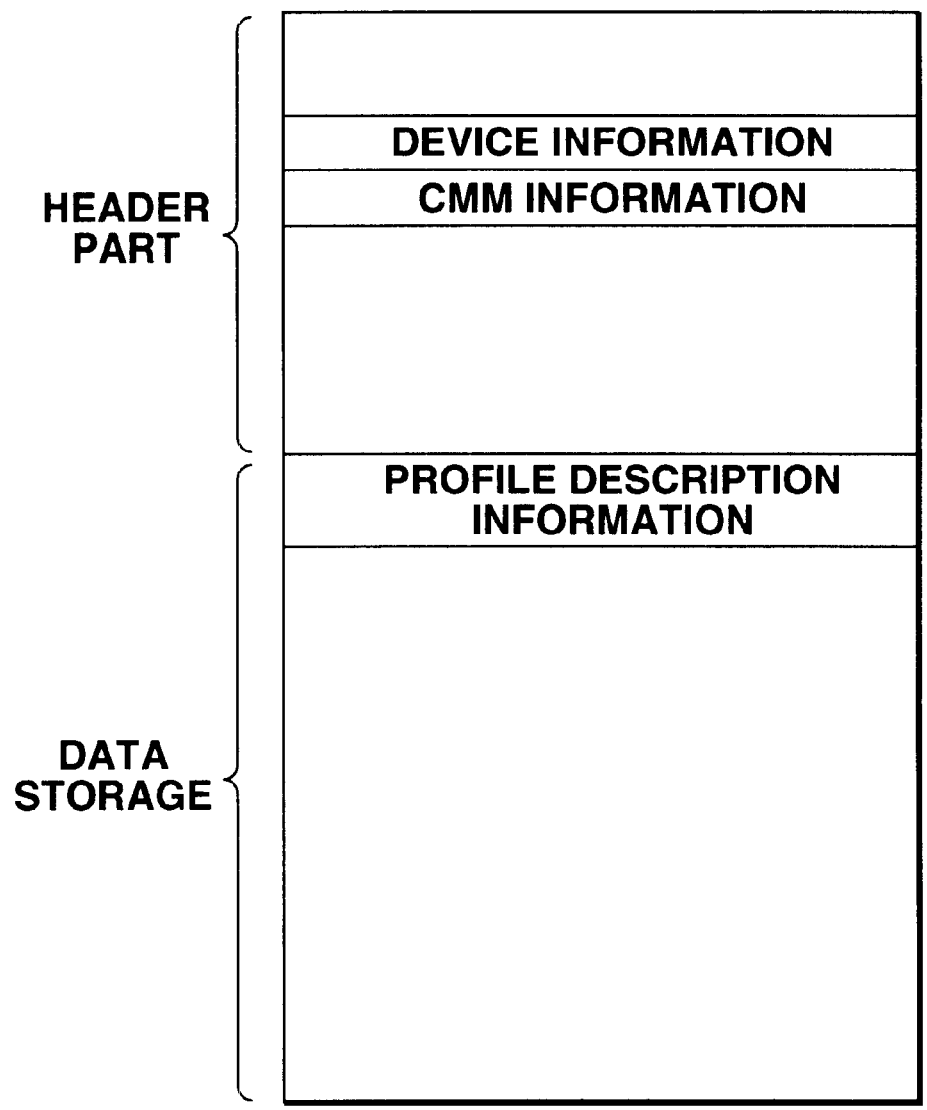
FIG. 2 shows a prior art structure of a device profile.
Figure 3:
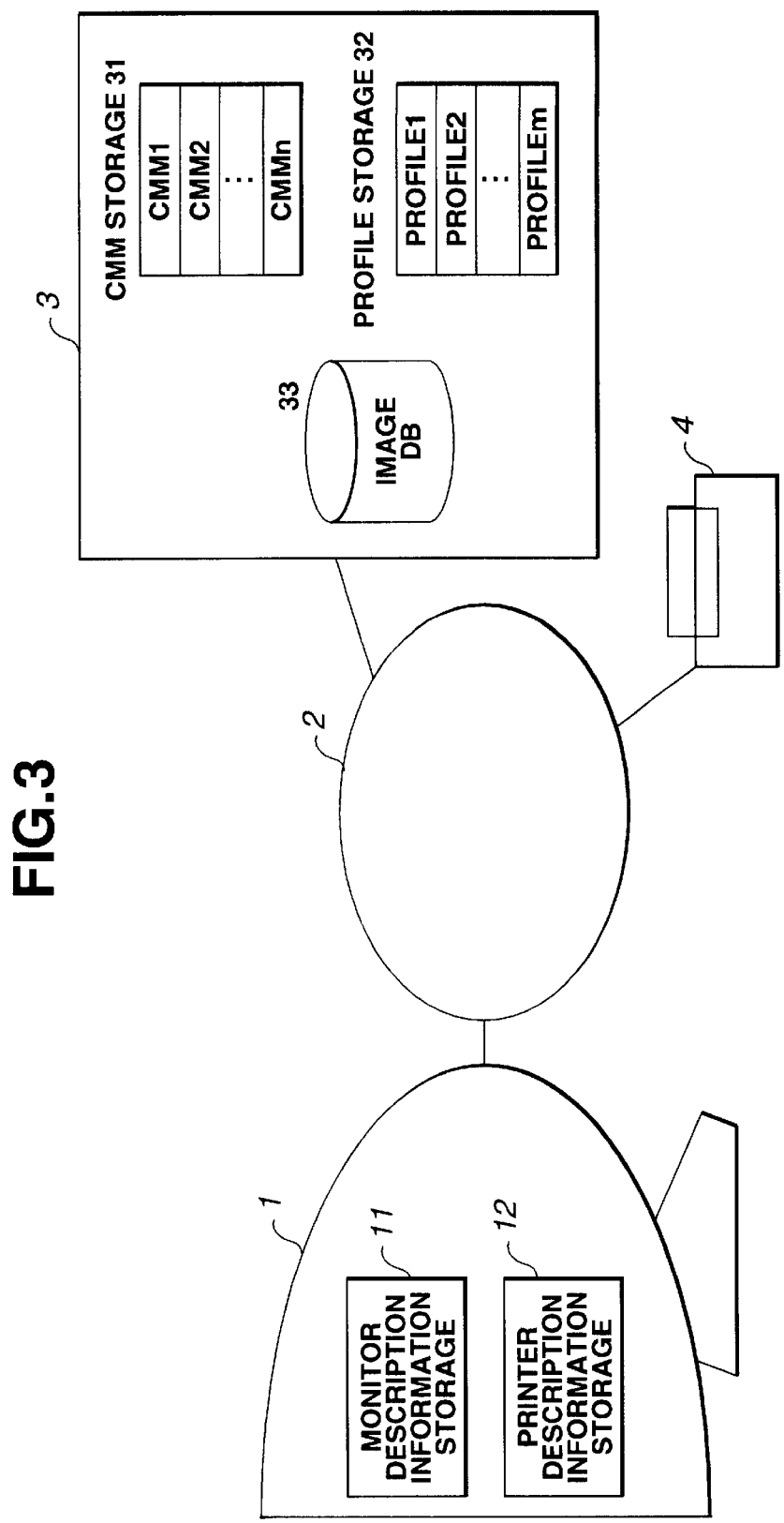
FIG. 3 shows an example of the construction the network system of one embodiment of the present invention.

FIG. 3 shows a block diagram of the network system for explaining a preferred embodiment of the present invention.

As is shown in FIG. 3, the network system of this embodiment comprises network client 1, which includes at least a computer, for example, a personal computer or a work station used by an ordinary user for his jobs, network server 3, which includes a computer usually having higher calculation capability than the computer of network client 1 and used for managing the whole network system, network printer 4, which is used to form an image based on the information produced by network client 1, network server 3 or any additional networked device such as a scanner, and network 2, to which former three devices will be connected for data transmission.

Network client 1 has CPU, VRAM and various logic chips, which are necessary for displaying on the monitor or image processing, and the transmission function, which is necessary for transmission on the network. Network client 1 also includes a monitor description information storage 11 for storing the information for discriminating the monitor of the network client 1 and printer description information storage 12 for storing the information for discriminating network printer 4.

Network server 3 has CPU, RAM, hard-disk and various logic chips, which are necessary for image processing or printing, and the transmission function, which is necessary for transmission on the network. Network server 3 also includes a CMM storage 31 in which n (n is a constant) CMM are registered, profile storage 32 in which m (m is a constant) device profiles (monitor, scanner, printer) are stored, and image DB (database) 33 in which image files are stored.

Each of the CMM registered in CMM storage 31 has registered information (ex. 4 byte alphanumeric characters) for discriminating a kind of CMM.

Figure 4:
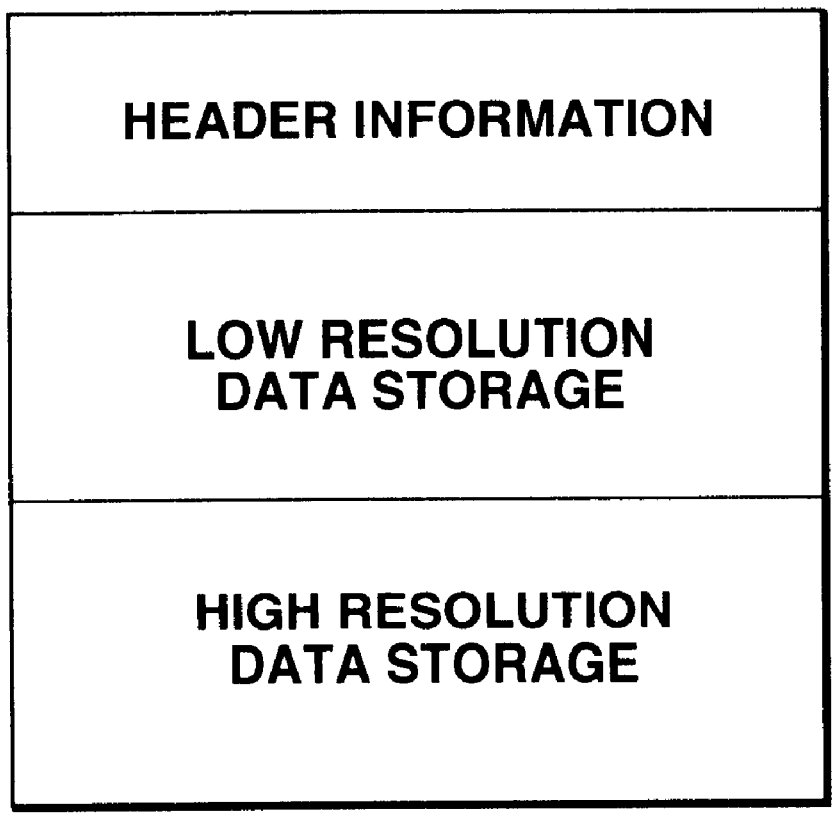
FIG. 4 shows an example of the structure of the image file.

FIG. 4 shows one example of a structure of an image file stored in image DB 33. Here, an image file includes a header information part, which is used for managing the image file and in which the information of the number of pixels in the image file, the information regarding the color space and/or the source profile of the image and so on are stored. The image file also includes a low-resolution data storage part and a high-resolution data storage part.

Low-resolution image data, which is used for displaying or output by a low-resolution device, such as a monitor, is stored in the low-resolution data storage part.

High-resolution image data, which is used for output by a high-resolution device, such as a printer or a printing machine, is stored in the high-resolution data storage part.

Both the low-resolution image data and the high-resolution image data correspond to the same original image.

Figure 5:
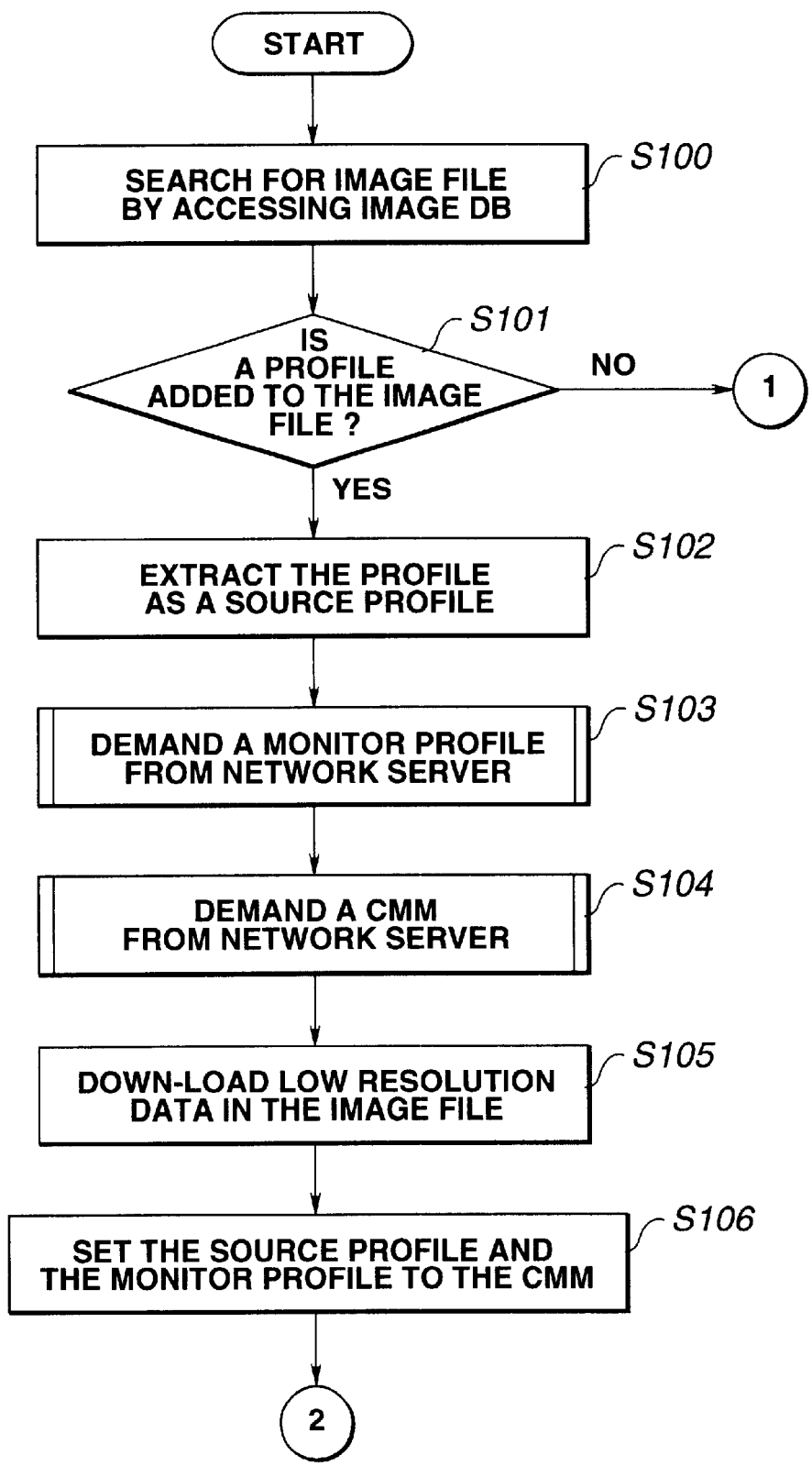
FIG. 5 is a flowchart showing the processing of performing the color matching process on the image data in a image file based on the characteristic of the client monitor and displaying on the monitor of network client 1 based on the result.
Figure 6:
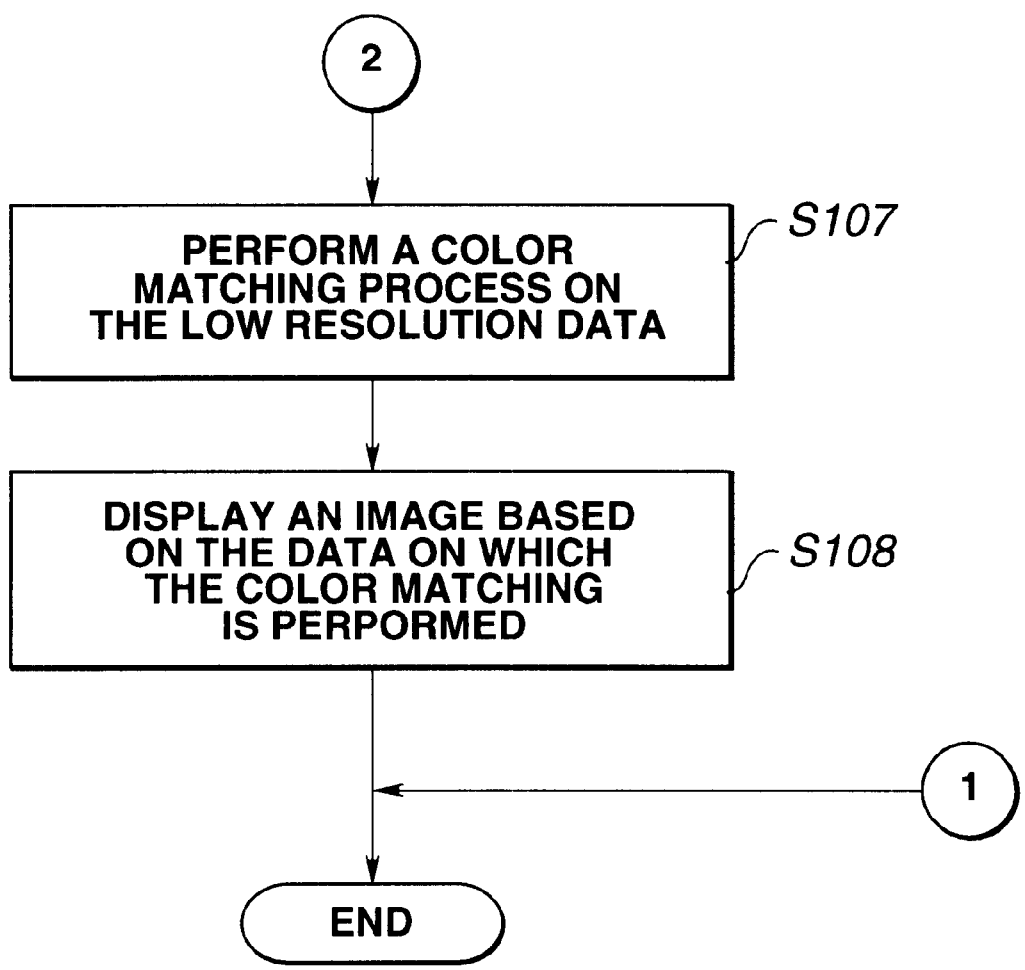
FIG. 6 is a flowchart showing the processing of performing the color matching process on the image data in a image file based on the characteristic of the client monitor and displaying on the monitor of network client 1 based on the result.

FIGS. 5 and 6 are flowcharts describing the processing performed in the network system, when the image data in the image file is displayed at the network client 1, especially when the low resolution image data in the image file is displayed on the monitor of network client 1 after it is matched to the characteristic of the monitor of network client 1 by the color matching processing performed in network client 1.

In step S100, network client 1 instruct network server 3 to access image DB 33 of network server 3 through network 2 and to search for the image file to be displayed on the monitor of network client 1.

In the step S101, network client 1 examines whether a profile is added to the header information part of the searched image file or not. If the profile is not added to the header information part, network server 3 judges that the color matching is not necessary and the low-resolution data of the image file is down-loaded to the network client 1 and the image is displayed on the monitor, after that the processing ends.

On the other hand, if the profile is added to the header information part, the processing goes to the step S102, then network server 3 extracts the profile from the header information part and down-loads to network client 1 as a source profile. Here, the source profile is a profile of a scanner, a monitor and so on.

In the step S103, network client 1 demands the profile of a monitor, which is to be the destination device, from network server 3, and down-loads to network client 1.

In the step S104, network client 1 demands CMM from network server 3 and down-loads to network client 1.

In the step S105, network server 3 extracts low-resolution image data from the low-resolution data storage of the image file and down-loads to network client 1.

In the step S106, network client 1 sets the source profile down-loaded in S102 and the monitor profile down-loaded in S103 to the CMM down-loaded in S104.

In the step S107, network client 1 performs the color matching process on the low-resolution image data extracted in S105 by using the CMM set in S106.

In the step S108, network client 1 displays an image on the monitor of network client 1 based on the color-matched image data, after that the processing ends.

According to the above mentioned process, it is possible to down-load the profiles and CMM from network server 3, to perform color-matching procession the low-resolution image data of the image file in the image DB 33 at the side of network client 1, and to display on the monitor of network client 1.

That is, according to this embodiment, it is possible to realize high quality color-matching in the network system because the network system supports the function of down-loading data needed for color-matching processing through the network to the network client.

Also it is possible to reduce the memory size for storing the profiles and CMM at the side of network client 1 by utilizing the function of network server 3.

Further, it is possible for the user of network client 1 to modify the color process parameter by looking at the displayed image quickly because the color-matching process is performed at the side of the network client 1 by using the low-resolution image data.

Figure 7:
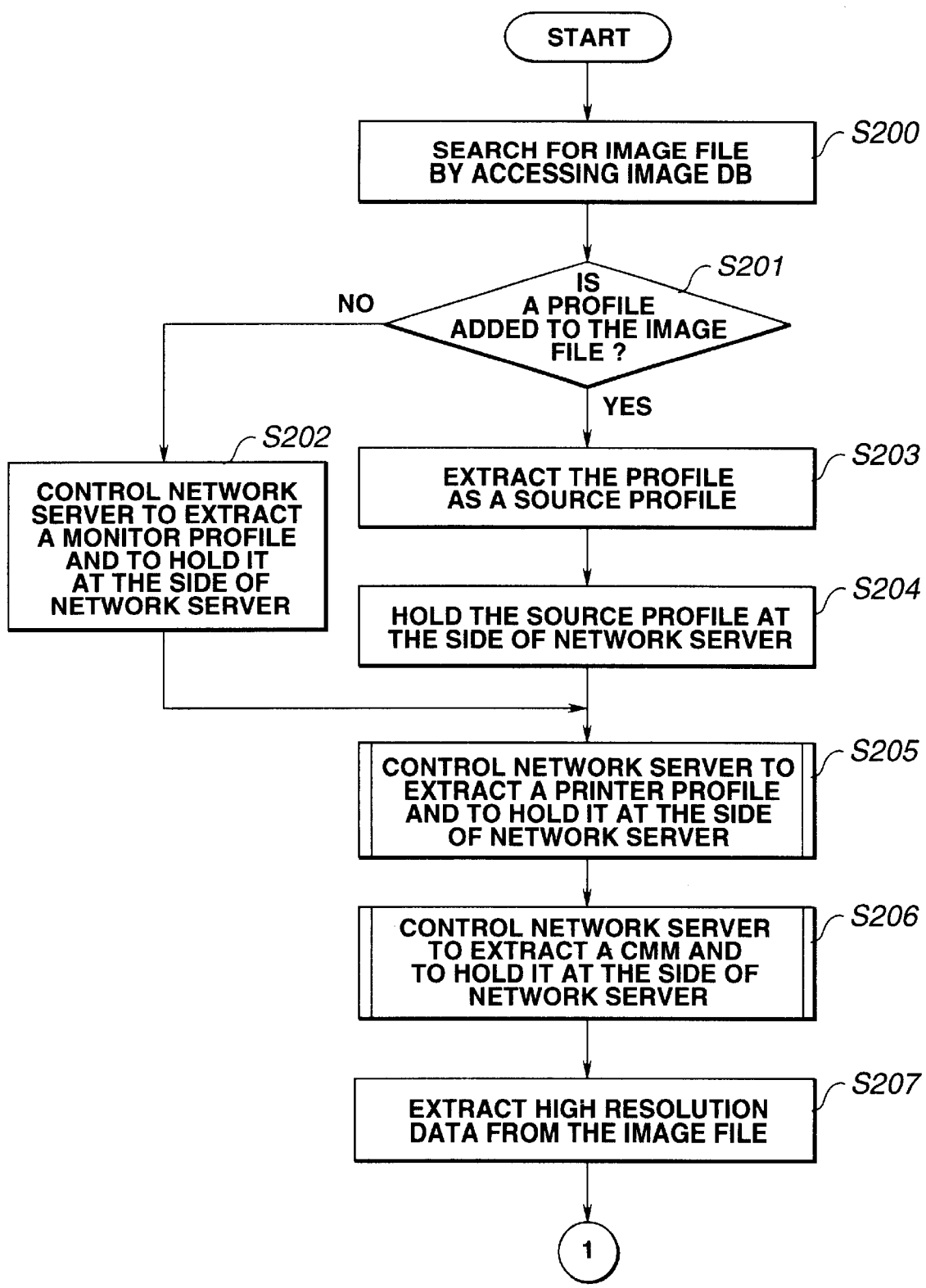
FIG. 7 is a flowchart showing the processing of performing the color matching process on the image data in a image file by network server 3 based on the characteristic of the network printer 4 and outputting to network printer 4.
Figure 8:
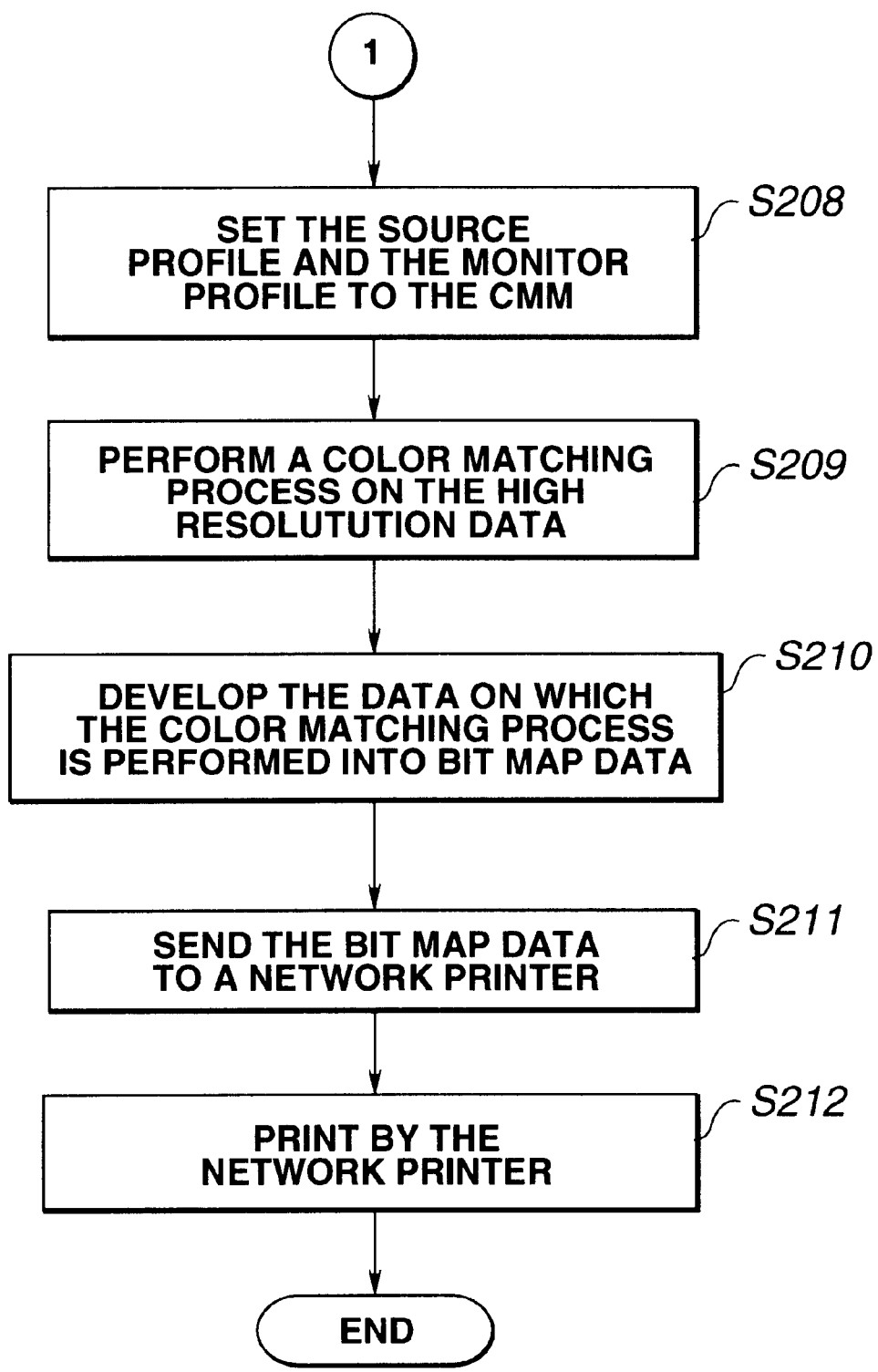
FIG. 8 is a flowchart showing the processing of performing the color matching process on the image data in a image file by network server 3 based on the characteristic of the network printer 4 and outputting to network printer 4.

FIGS. 7 and 8 are flow-charts describing the processing performed in the network system, when the image data in the image file stored in image DB 33 is high resolution image data and is to be printed by network printer 4, especially when the high resolution image data in the image file is printed by network printer 4 after it is matched to the characteristic of network printer 4 by the color matching processing performed at the side of network server 3.

In the step S200, network client 1 instructs network server 3 to access image DB 33, to search for the image file to be printed by network printer 4, and to execute the printing process for printing by network printer 4.

Network server 3 performs the following processing of S201~S211 for executing the printing process.

In the step S201, network server 3 examines whether a profile is added to the header information part of the searched image file or not.

If the profile is not added to the header information part, proceeding to S202. Then, network server 3 extracts the monitor profile and to hold it as a source profile. In this case, it is judged that the color of the image displayed on the monitor of network client 1 in accordance with the monitor characteristic is the color which the user of network client 1 wants to output. That is the color of the printed image is matched to the color of the monitor of the network client 1.

On the other hand, if the profile is added to the header information part, network client 1 instruct network server 3 to extract the profile from the header information part in the step S203 and to hold it at the side of network server 3 as a source profile in the step S204. In this case the profile to be used is the profile of a scanner or a monitor and so on.

In the step S205, network server 3 extracts a printer profile from profile storage 32, and in the step S206, it extracts CMM from CMM storage 31, and in the step S207, it extracts high-resolution image data from high-resolution data storage part of the image file in image DB 33, and all of them are held by network server 3.

In the step S208, network server 3 sets the source profile extracted in S202 or S203 and the printer profile extracted in S205 to the CMM extracted in S206.

In the step S209, the color matching processing is performed on the high-resolution image data held in S207 by using the CMM set in S208.

In the step S210, the color-matched image data is developed into bit-map data in network server 3, in order to output by network printer 4.

In the step S211, the bit-map data developed in S210 is sent from network server 3 to network printer 4 through network 2.

In the step S212, network printer 4 receives the sent bit-map data and print the image, after that the processing ends.

According to the above mentioned process, it is possible to instruct network server 3 to extract the necessary profiles and CMM to perform color-matching process on the high-resolution image data of the image file in the image DB 33 at the side of network server 3, and to print by network printer 4. That is it is possible to perform color-matching process on the high-resolution image data efficiently, by utilizing the high performance of network server 3.

Figure 9:
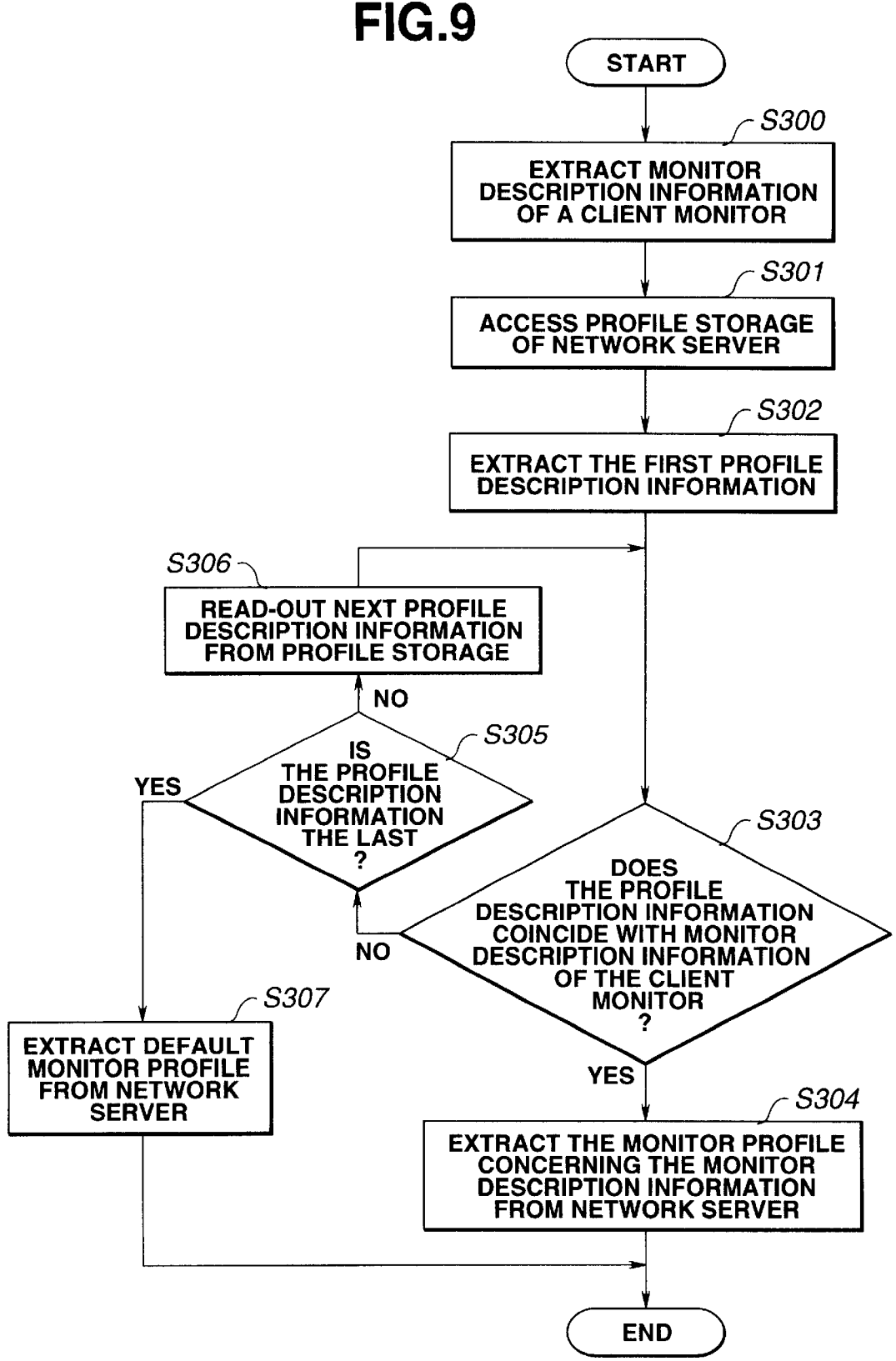
FIG. 9 is a flowchart of the detailed processing of S103 of FIG. 5.

Next, down-loading process of the monitor profile of the monitor of network client 1 from network server 3 to network client 1 based on the request of network client 1 is shown in FIG. 9 in detail.

In the step S300, network client 1 extracts monitor description information representing the type of the monitor of network client 1 from monitor description information storage part 11. For example, the monitor description information may be determined by selecting the monitor type with the operation system software of the network client 1.

In the step S301, network client 1 accesses profile storage 32 of network server 3.

Network server 3 performs following processing in accordance with the monitor description information.

In the step S302, network server 3 extracts the profile description information of the data storage part of the first profile in profile storage 32.

In the step S303, network server 3 examines whether the profile description information extracted in S302 coincides with the monitor description information extracted in S300. If no coincidence, proceeding to S305, and network server 3 examines whether the profile description information currently read-out is the last profile or not.

If the profile description information is the last profile, then proceeding to S307, and a default monitor profile stored in profile storage part 32 of network server 3 is extracted and down-loaded to network client 1, after that the processing ends. On the other hand if the profile description information is not the last profile, then proceeding to S306, and network server 3 extracts profile description information of the next profile in the data storage and back to S303.

If the profile description information extracted in S302 coincides with the monitor description information extracted in S300, proceeding to S304, and the monitor profile corresponding to the profile description information is extracted from network server 3 and down-loaded to network client 1 and the processing ends.

According to the above mentioned process, it is possible to demand the monitor profile of the monitor of network client 1 from network server 3 and to down-load to network client 1. As a result, it is possible to reduce the memory amount of network client 1 for storing the monitor profile, by utilizing the large memory of network server 3.

Figure 10:
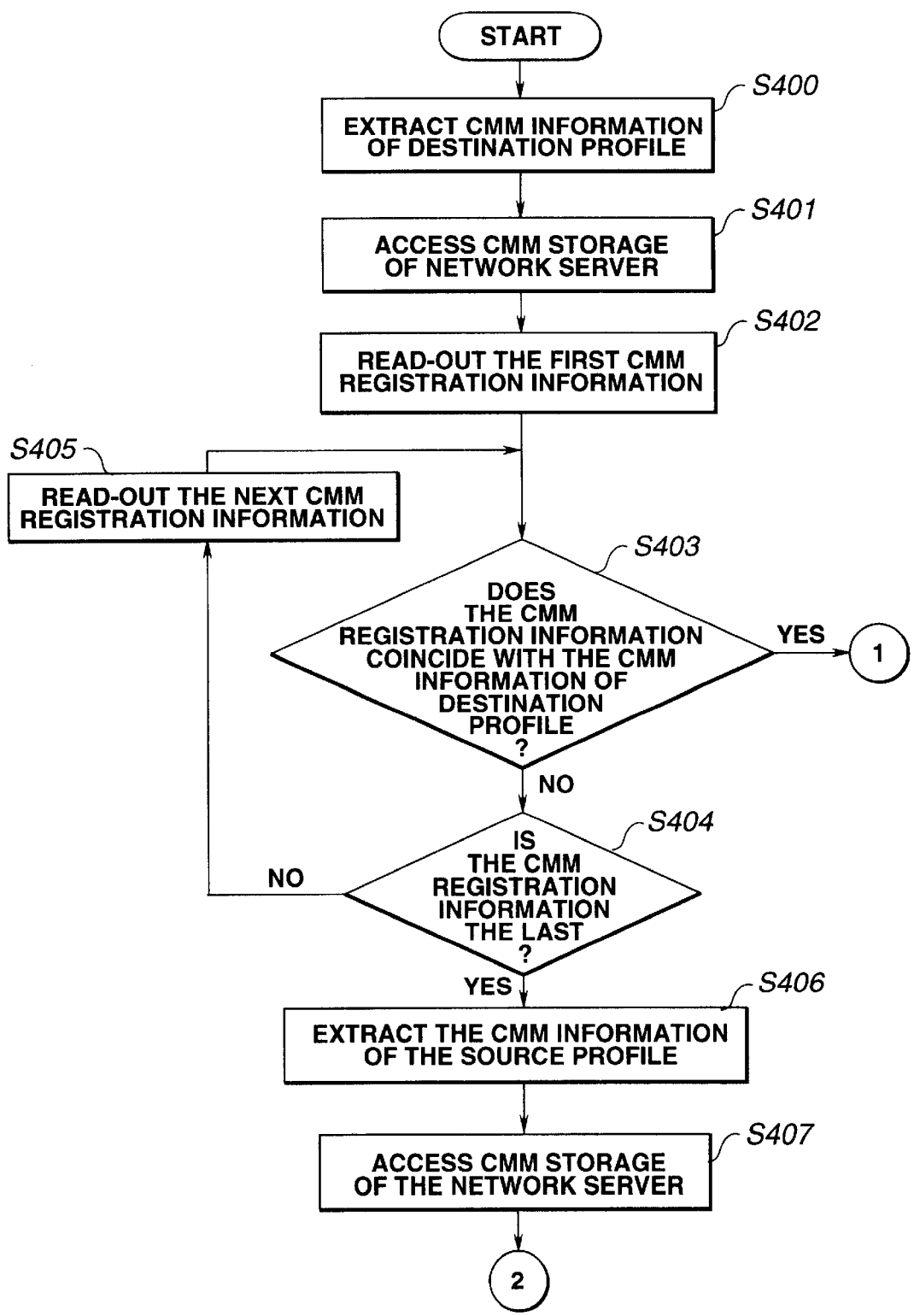
FIG. 10 is a flowchart of the detailed processing of S104 of FIG. 5.
Figure 11:
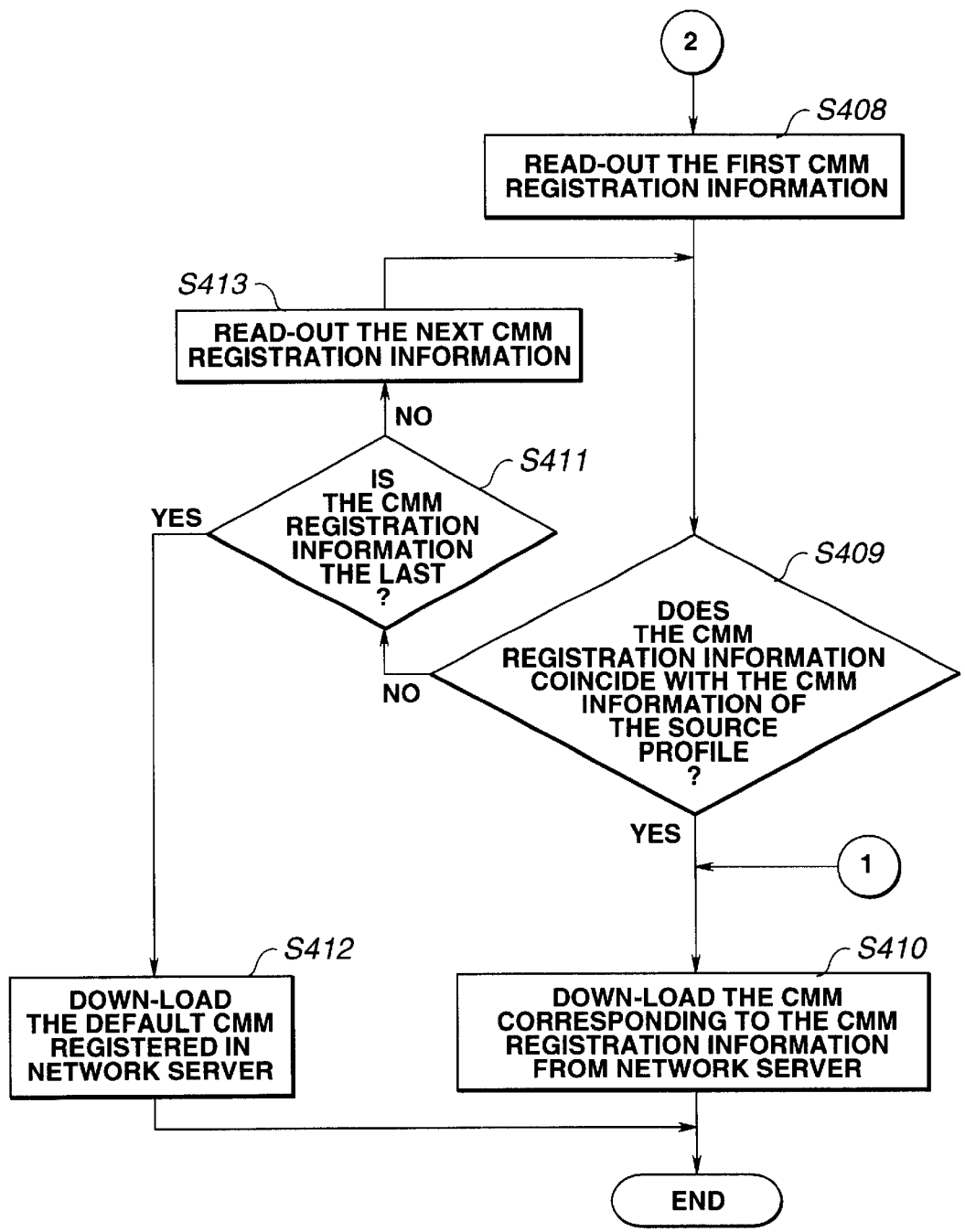
FIG. 11 is a flowchart of the detailed processing of S104 of FIG. 5.

The down-loading process of the CMM used, in S104 of FIG. 5, for color matching process by demanding it from network server 3 will be shown in FIGS. 10 and 11 in detail.

In the step S400, network client 1 extracts CMM information of destination profile (Here, a monitor profile because this is the example of the monitor display.).

In the step S401, network client 1 accesses CMM storage 31 of network server 3.

In the step S402, network server 3 extracts the first CMM information in CMM storage 31.

In the step S403, network server 3 examines whether the CMM information extracted in S402 coincides with the CMM information extracted in S400. If the CMM information extracted in S402 coincides with the CMM information extracted in S400, then the process goes to S410. If no coincidence, proceeding to S404, and network client 1 examines whether the CMM information currently read-out is the last CMM or not.

If the CMM information is not the last CMM, then proceeding to S405, and network client 1 extracts the next CMM in CMM storage 31 and back to S303. On the other hand, if the CMM information is the last CMM, then proceeding to S406 and network client 1 extracts the CMM of the source profile.

In the step S407, network client 1 accesses CMM storage 31 of network sever 3, and in the step S408, extracts the CMM information of the first profile in CMM storage part 31 of network server 3, and in the step S409, network sever 3 examines whether the CMM information extracted in S408 coincides with the CMM information of the source profile extracted in S406.

If the CMM information extracted in S408 doesn't coincides with the CMM information of the source profile extracted in S406, proceeding to S411, and network sever 3 examines whether the CMM information currently read-out is the last profile or not.

If the CMM information currently read-out corresponds to the last profile, then proceeding to S412, and a default CMM is extracted from CMM storage part 31 of network server 3, and down-loaded to network client 1, and the process ends. On the other hand, if the CMM information currently read-out doesn't correspond to the last profile, then proceeding to S413, and CMM information of the next profile is extracted and back to S409.

In S409, if the CMM information extracted in S412 coincides with the CMM information of the source profile extracted in S406, then proceeding to S410 and the CMM is extracted from network server 3 and down-loaded to network client 1 and the process ends.

According to the above mentioned process, it is possible to demand network server 3 to down-load the CMM to network client 1, to perform color-matching process. As a result, it is possible to reduce the memory amount of network client 1 for storing the CMM, by utilizing the large memory of network server 3.

Figure 12:
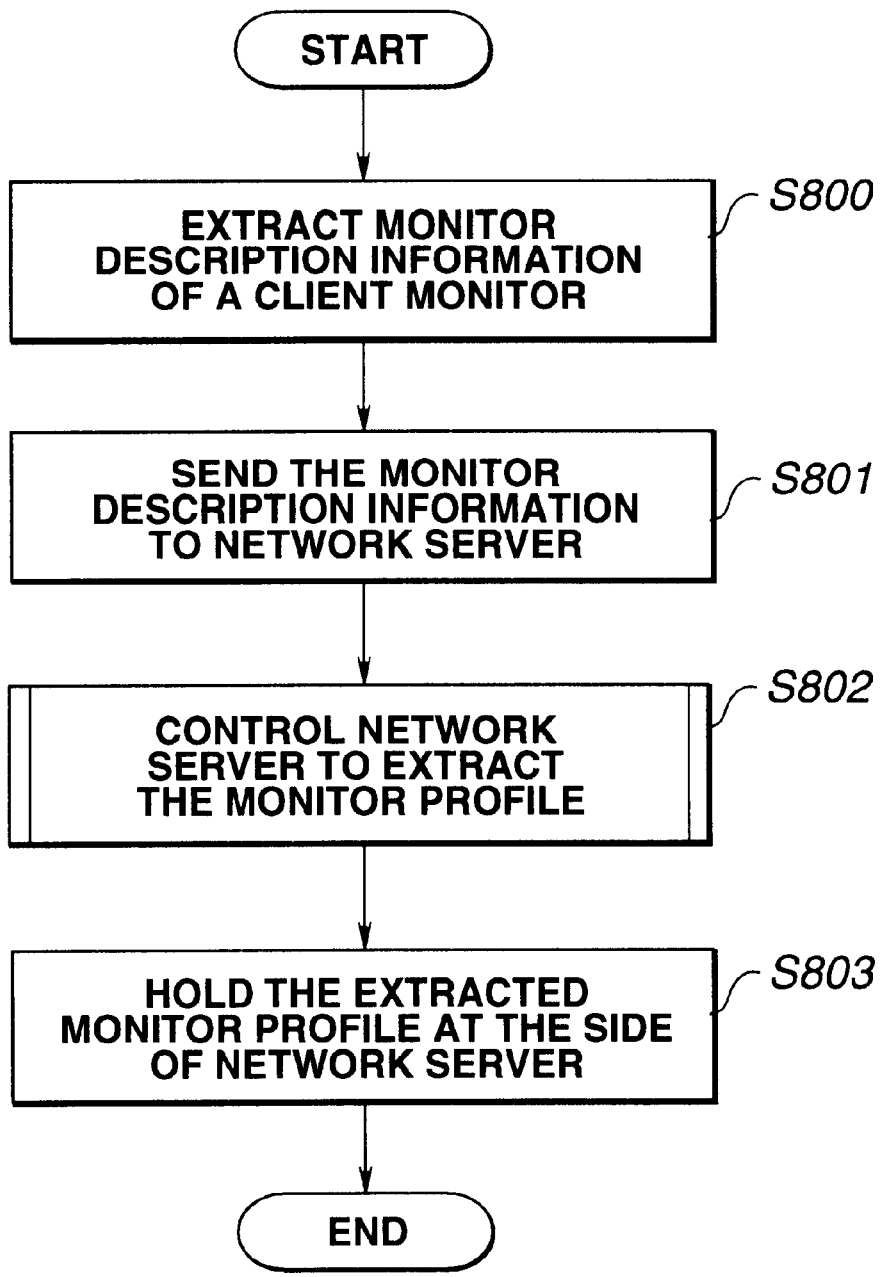
FIG. 12 is a flowchart of the detailed processing of S202 of FIG. 7.

FIG. 12 shows the processing of extracting the monitor profile of the monitor of network client 1 and holding it at network server 3 in S202 of FIG. 7.

In the step S800, network client 1 extracts the description information of the monitor profile of network client 1 from monitor description information storage part 11.

In the step S801, network client 1 sends the description information of the monitor profile extracted in S800 to network server 3 through network 2.

In the step S802, network server 3 extracts the monitor profile corresponding to the monitor of network client 1 based on the description information of the monitor profile sent in S801, and in the step S803, network server 3 holds the monitor profile extracted in S802, and the process ends.

According to the above mentioned process, it is possible to demand network server 3 to extract the monitor profile of the monitor of network client 1, and to hold it at the side of network server 3.

Figure 13:
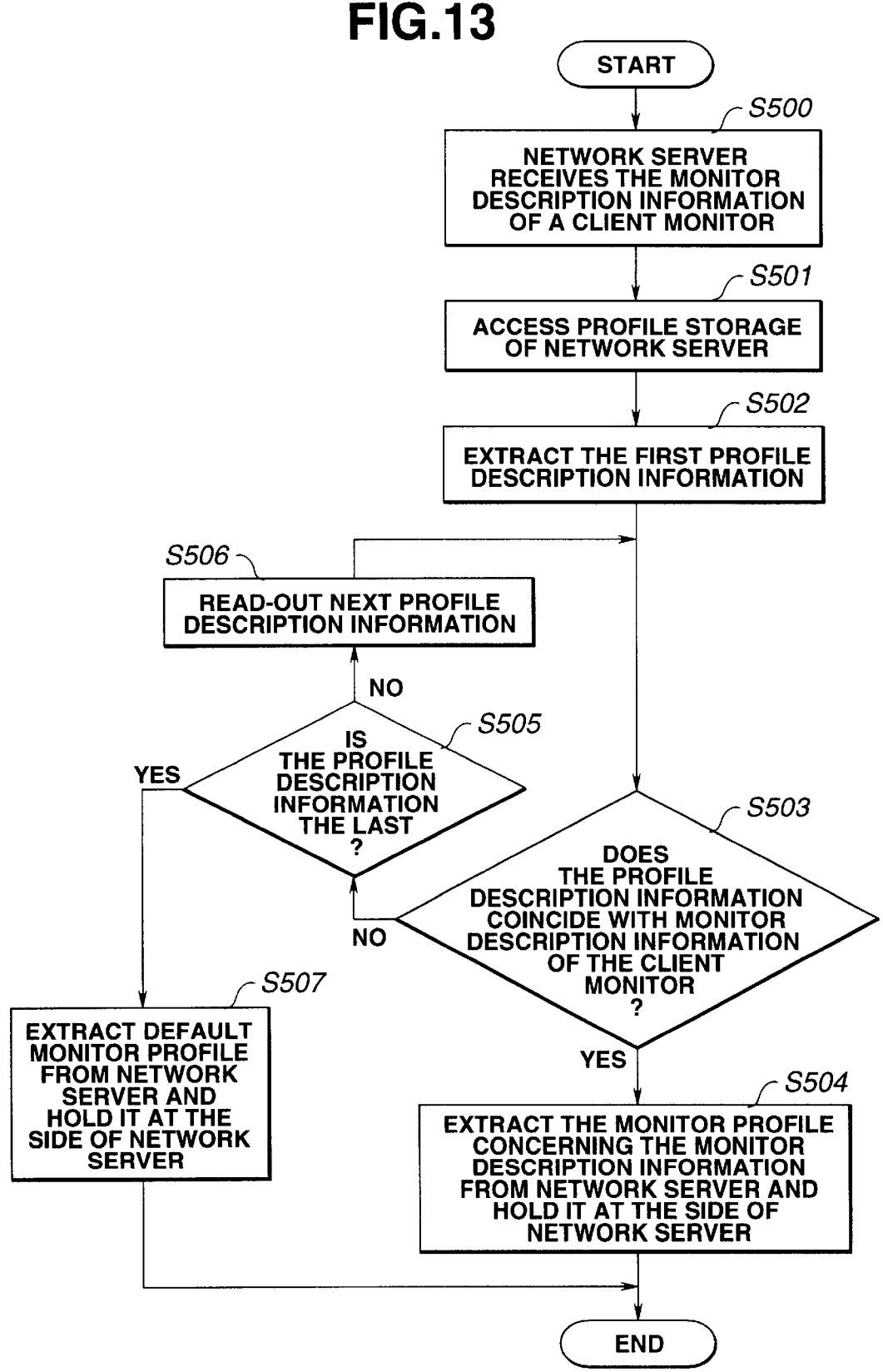
FIG. 13 is a flowchart of the detailed processing of S802 of FIG. 12.

FIG. 13 shows the processing of extracting the monitor profile of the monitor of network client 1 and holding it at network server 3 in S802 of FIG. 7.

In the step S500, network server 3 receives the description information of the monitor of network client 1.

In the step S501, network server 3 accesses profile storage 32 of network server 3.

In the step S502, network server 3 extracts the profile description information of the data storage part of the first profile in profile storage 32.

In the step S503, it is determined whether the profile description information extracted in S502 coincides with the monitor description extracted in S500. If no coincidence, proceeding to S505, and network server 3 examines whether the profile description information currently read-out is the last profile or not.

If the profile description information is the last profile, then proceeding to S507, and a default monitor profile stored in profile storage part 32 of network server 3 is extracted, and after that the processing ends. On the other hand if the profile description information is not the last profile, then proceeding to S506, and network server 3 extracts profile description information of the next profile in the data storage and back to S503.

If the profile description information extracted in S502 coincides with the monitor description extracted in S500, proceeding to S504, and the monitor profile corresponding to the profile description information is extracted from network server 3 and processing ends. According to the above mentioned process, it is possible to demand network server 3 to extract the monitor profile of the monitor of network client 1.

Figure 14:
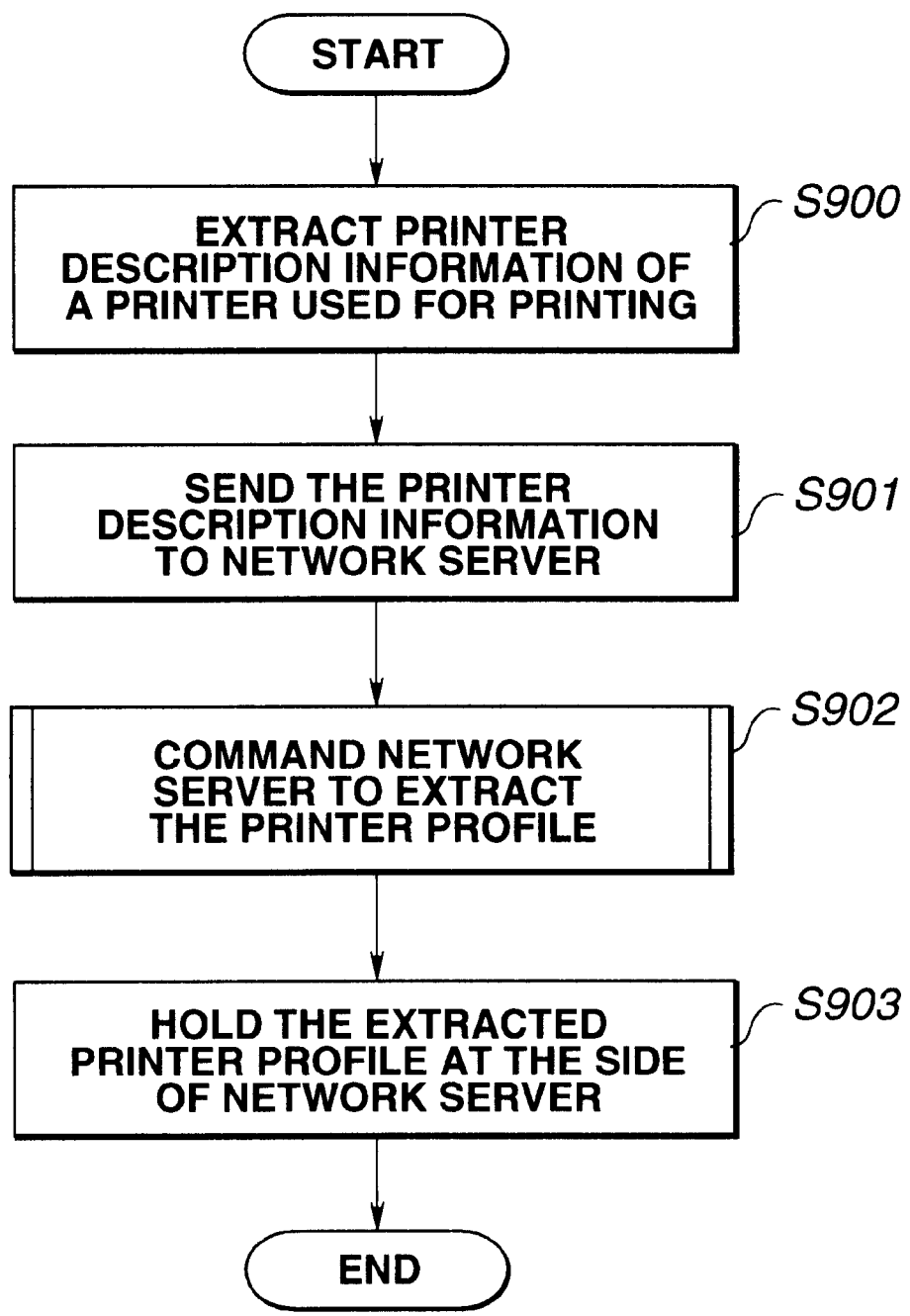
FIG. 14 is a flowchart of the detailed processing of S205 of FIG. 7.

FIG. 14 is shows the processing of extracting the printer profile of network printer 4 and holding it at network server 3 in S205 of FIG. 7.

In the step S900, network client 1 extracts the description information of the printer profile of network printer 4 from printer description information storage part 11. For example, the printer description information may be determined by selecting the printer type with the application software or the operation system software of the network client 1.

In the step S901, network client 1 sends the description information of the printer profile extracted in S900 to network server 3 through network 2.

In the step S902, network server 3 extracts the printer profile of network printer 4 based on the description information of the printer profile sent in S901, and in the step S903, network server 3 holds the printer profile extracted in S902, and the process ends.

According to the above mentioned process, it is possible to demand network server 3 to extract the printer profile of network printer 4, and to hold it at the side of network server 3.

Figure 15:
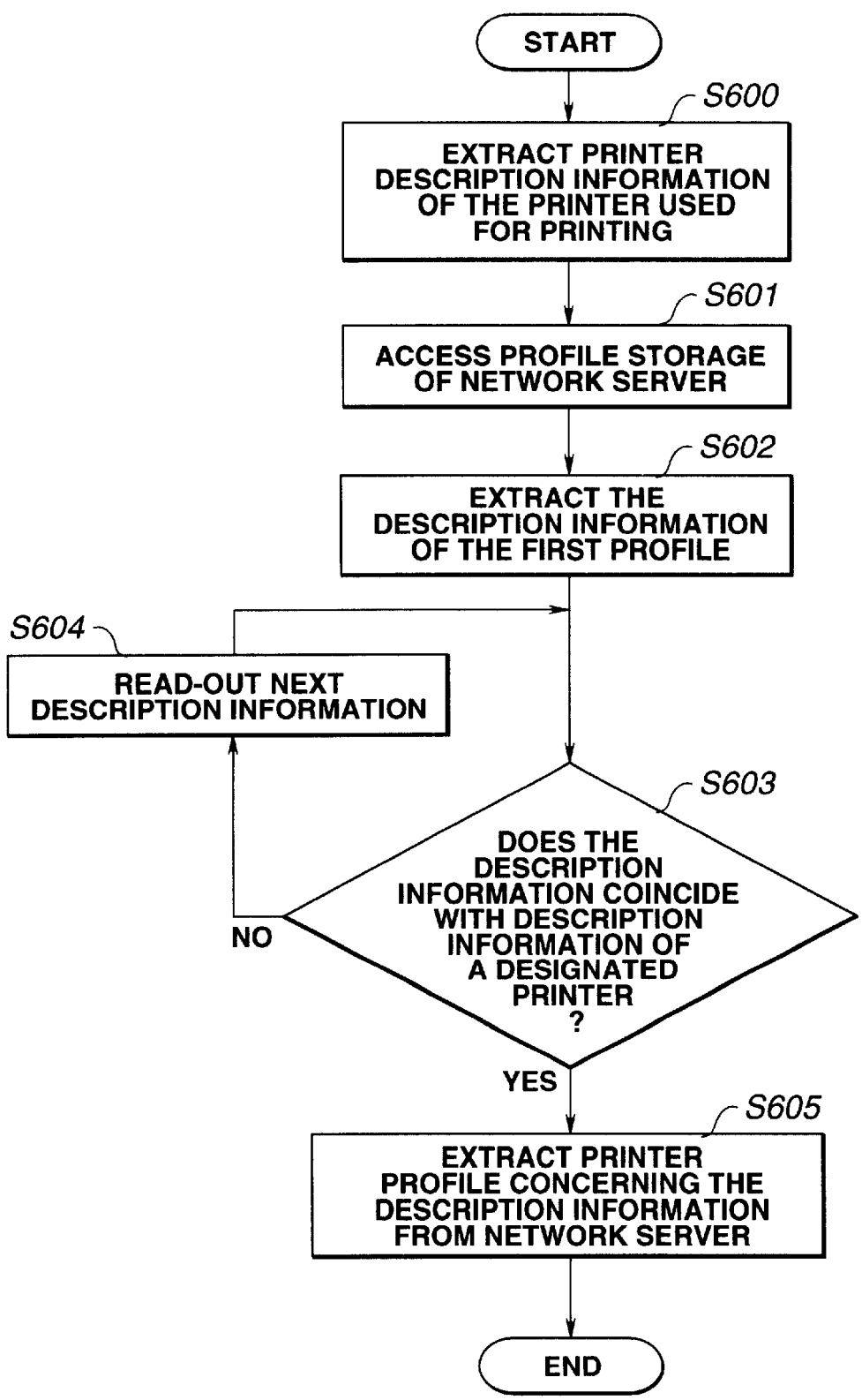
FIG. 15 is a flowchart of the detailed processing of S902 of FIG. 14.

FIG. 15 shows, in detail, the process of extracting the printer profile of network printer 4, which is performed in S902 of FIG. 14.

In the step S600, network server 3 extracts printer description information of network printer 4 from printer description information storage part 12.

In the step S601, network server 3 accesses profile storage 32 of network server 3.

In the step S602, network server 3 extracts the profile description information of the data storage part of the first profile in profile storage 32.

In the step S603, it is determined whether the profile description information extracted in S602 coincides with the printer description information extracted in S600. If no coincidence, proceeding to S604, and network server 3 extracts the profile description information of the data storage part of the next profile, and back to S603.

If the profile description information extracted in S602 coincides with the printer description information extracted in S600, proceeding to S605, and the printer profile corresponding to the profile description information is extracted from network server 3 and the processing ends.

According to the above mentioned process, it is possible to demand the printer profile of the network printer 4 from network server 3 and hold at the side of network server 3.

Figure 16:
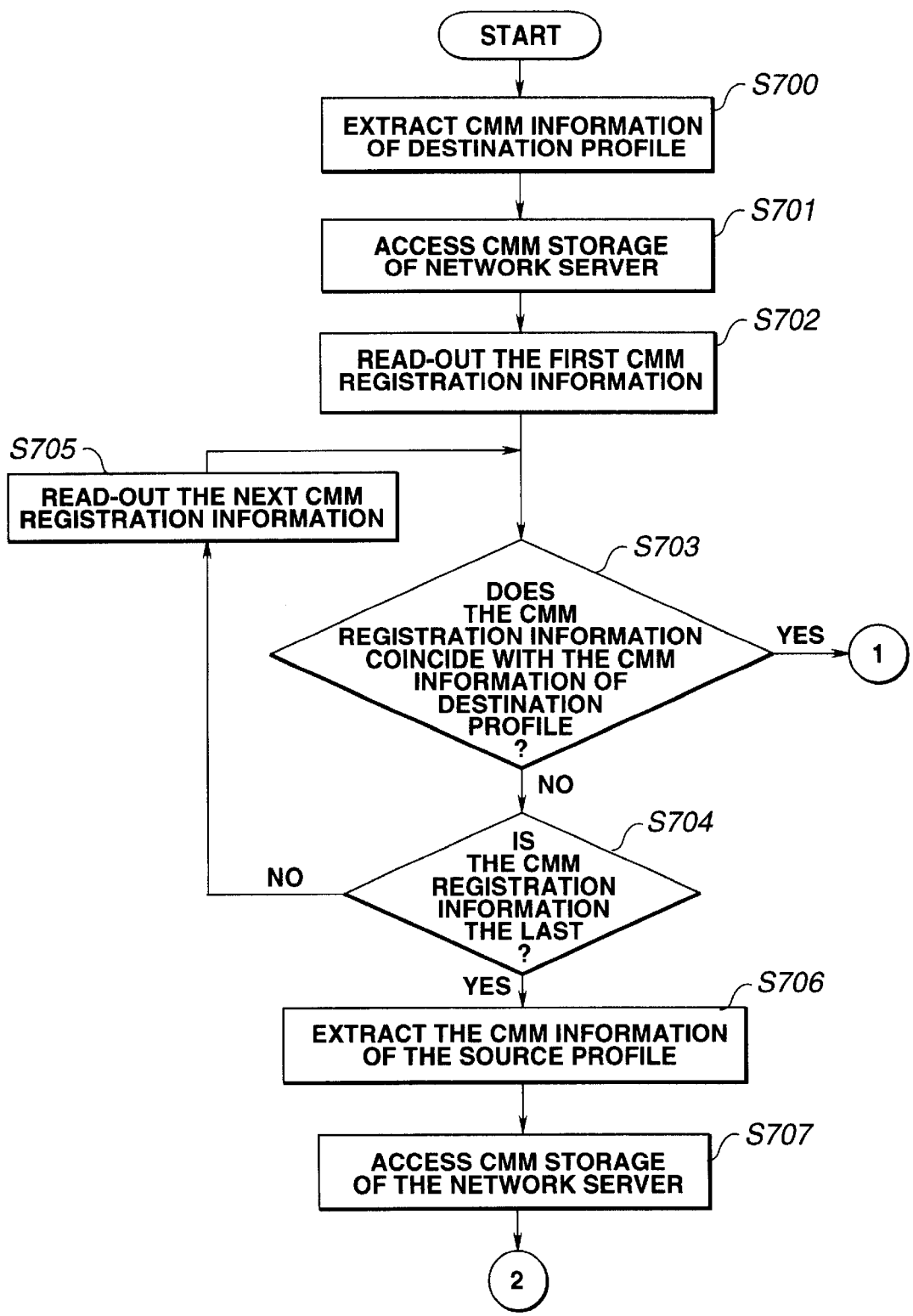
FIG. 16 is a flowchart of the detailed processing of S206 of FIG. 7.

The process of extracting the CMM used, in S206 of FIG. 7, for color-matching process by demanding it from network server 3 and holding it at the side of network server 3 will be shown in FIGS. 16 and 17 in detail.

In the step S700, network server 3 extracts and holds CMM information of destination profile (a monitor profile for monitor display, a printer profile for printing).

In the step S701, network server 3 accesses CMM storage 31 of network server 3.

In the step S702, network server 3 extracts the first CMM information in CMM storage 31.

In the step S703, it is determined whether the CMM information extracted in S702 coincides with the CMM information extracted and held in S700. If the CMM information extracted in S702 coincides with the CMM information extracted and held in S700, then the process goes to S710. If no coincidence in S703, proceeding to S704, and network server 3 examines whether the CMM information currently read-out is the last CMM or not.

If the CMM information is not the last CMM, then proceeding to S705, and network server 3 extracts the next CMM in CMM storage 31 and back to S703. On the other hand, if the CMM information is the last CMM, then proceeding to S706 and network server 3 extracts the CMM of the source profile.

In the step S707, network server 3 accesses CMM storage 31 of network sever 3, and in the step S708, extracts the CMM information of the first profile in CMM storage part 31 of network server 3.

In the step S709, it is determined whether the CMM information extracted in S708 coincides with CMM information of the source profile extracted in S706.

If the CMM information extracted in S708 doesn't coincides with the CMM information of the source profile extracted in S706, proceeding to S711, and it is examined whether the CMM information currently read-out is the last profile or not.

If the CMM information currently read-out corresponds to the last profile, then proceeding to S712, and a default CMM is extracted from CMM storage part 31 of network server 3, and held by network server 3, and the process ends. On the other hand, if the CMM information currently read-out doesn't correspond to the last profile, then proceeding to S713, and CMM information of the next profile is extracted and back to S709.

In S709, if the CMM information extracted in S712 coincides with the CMM information of the source profile extracted in S706, then proceeding to S710 and the CMM is extracted from network server 3 and held by network server 3 and the process ends.

According to the above mentioned process, it is possible to instruct network server 3 to extract and hold the CMM used for color-matching process.

As explained above, in this embodiment, when the color-matching is performed on image data and an image is displayed on the monitor of the network client based on the image data, profiles and CMM to be needed are downloaded to the network client and the color-matching process is performed on the low-resolution image data in an image file at the side of the network client.

As a result, the load of the processing at the network client can be reduced because the image data is low-resolution data.

On the other hand, when the color-matching is performed on image data and an image is printed by the network printer based on the image data, profiles and CMM to be needed are extracted by network server 3 and the color-matching process is performed on the high-resolution image data in an image file at the side of network server 3.

As a result, the load of the processing at the network client can be reduced because the color-matching of the high-resolution image data for high quality printing is performed at the side of network server.

That is, according to this embodiment, the color-matching is efficiently performed in the network system as a whole.

Second Embodiment

As discussed above with respect to network printer 4, various image forming apparatus, for example, color LBP, ink-jet printer, printing machine, can be connected to the network.

Accordingly, the resolution of the network printer cannot be fixed to one resolution.

In this second embodiment, as a modification of the first embodiment, image DB 33 stores an image file having n (n is natural number) kinds of image data each of which has a different resolution and corresponds to the same original image.

In the second embodiment, the following processing is performed in S207 of FIG. 7.

The resolution of image data to be sent to network printer 4 is judged based on the header information of the printer profile extracted in S205. And network server 3 selects image data of a resolution which is the same as or higher than the resolution of the network printer 4 and is nearest to the resolution of the network printer 4 from among the n kinds of the image data.

Here, when the image data of a resolution which is higher than the resolution of the printer is selected, CPU of network server 3 performs resolution conversion on the selected image data and generates the image data of the resolution which is the same as the resolution of the printer.

The image data, which is obtained in this way and has the same resolution as the printer resolution, is held in network server 3 and the step S207 ends.

According to this embodiment, image data suitable for the printer resolution can be sent to the printer and it's possible to form a high quality image.

Also, it's possible to reduce the load of resolution conversion process and to output high quality images because the image data, having a resolution which is the same as or higher than the resolution of the printer and is nearest to the resolution of the printer, is used for printing.

Further, the efficient processing is possible because the resolution of the printer is judged by the printer profile which is used for the color-matching.

Besides, the resolution of the printer may be judged the printer type obtained from the printer description information, by storing, in the network server, the table representing the relation between the printer type and the printer resolution in advance.

Also, if the printer resolution is changeable by the manual instruction by a user, the information representing the resolution of the printing process can be received by the network server 3, when the network server 3 receives the instruction of printing from the network client 1.

Other Embodiment

Following modification of the embodiment is included in the concept of this invention. That is, providing program codes of a software for realizing the above mentioned function to a computer in the apparatus or the system connected to a various device, and making the computer (ex. CPU, MPU) in the apparatus or the system operate in accordance with the stored program, in order to realize the function of the above mentioned embodiment by using a device.

In this case, the program codes of said software themselves realizes the above mentioned function of the embodiment. The program codes themselves and means for supplying them to the computer, for example, the memory medium storing the program codes comprise the invention.

For example, floppy disks, hard disks, optical disks, opt-magnetic disks, CD-ROM, magnetic tapes, non-volatile memory card, ROM can be used as the memory medium storing the program codes.

It's needless to say that the above mentioned function of the embodiment can be realized not only by the computer which executes the supplied program codes but also by the computer which executes the supplied program codes together with the OS (operating system) operating the computer or other application software.

Further, the supplied program codes can be stored in the memory provided in the function extension board or the function extension unit connected to the computer, after that the CPU and so on, mounted on the function extension board or the function extension unit, may execute a part of or all of the processing based on the instruction of the program codes.

As explained above, according to one aspect of the embodiment, it's possible to support the color matching processing on the network system systematically, and to realize the color matching processing efficiently on the network system.

According to another aspect of the embodiment, it's possible to realize the color matching processing efficiently on the network system by changing the responsibility for the color matching processing between the network server and the network client in accordance with the purpose of the processing and using the image data of which resolution is determined according to the purpose of the processing.

According to further aspect of the embodiment, it's possible to realize the high quality color matching processing.

What is claimed is:

1. A network server comprising:
   a profile memory storing a plurality of profiles corresponding to devices;

an image data base memory storing a plurality of image files corresponding to images;

a color process module memory storing a color process module;

a communication circuit adapted for communicating with a network client through a network, wherein image data representing an image stored in said image data base memory, said color process module, and a profile stored in said profile memory are down-loaded to the network client through the network, and wherein the network client performs color matching processing on the down-loaded image data using the down-loaded profile and the down-loaded color process module; and a color matching process circuit adapted for performing the color matching processing on the image data by using a profile corresponding to an image forming apparatus and a source profile added to the image file, wherein, when the network client demands image forming processing, said color matching process circuit performs the color matching processing and said communication circuit sends the color matching processed image data to an image forming unit in order to form an image from the color matching processed image data.

2. A network server according to claim 1, wherein, when the source profile is not added to the image file, the color matching processing for the image forming processing is performed by using a profile corresponding to a monitor of the network client as the source profile.

3. An image processing method used in a network system, which comprises a network server, a network client, and a network printer, said method comprising the steps of:

when a color matching result is confirmed at the network client:

sending low-resolution data in an image file to the network client by the network server; and performing color matching processing on the low-resolution data by the network client, and displaying a result of the color matching processing on a monitor of the network client, and when image forming is performed by the network printer:

performing color matching processing on high-resolution data in the image file at the network server using a profile corresponding to an image forming apparatus and a source profile added to the image file; and sending the color matching processed high-resolution data to the network printer by the network server, wherein, when the network client demands image forming processing by the network printer, said color matching processing step performs the color matching processing and the color matching processed image data is sent to an image forming unit in order to form an image from the color matching processed image data.

4. A method according to claim 3, wherein the color matching processing is performed using a color management module and a device profile.

5. A method according to claim 3, wherein a resolution of the low-resolution data is close to a resolution of the monitor.

6. A method according to claim 3, wherein a resolution of the high-resolution data is close to a resolution of the network printer.

7. A computer program product comprising a computer-readable medium having a computer-readable program embodied in the medium for implementing a method of using a network server, said computer program product including:

computer-readable program code for storing a plurality of profiles corresponding to devices in a profile memory;

computer-readable program code for storing a plurality of image files corresponding to images in an image data base memory;

computer-readable program code for storing a color process module in a color process module memory;

computer-readable program code for communicating with a network client through a network, wherein image data representing an image stored in the image data base, the color process module, and a profile stored in the profile memory are down-loaded to the network client through the network, and wherein the network client performs color matching processing on the down-loaded image data using the down-loaded profile and the down-loaded color process module; and computer-readable program code for performing color matching processing on the image data by using a profile corresponding to an image forming apparatus and a source profile added to the image file, wherein, when the network client demands image forming processing, the color matching processing is performed and the color matching processed image data is sent to an image forming unit in order to form an image from the color matching processed image data.

8. A computer program product comprising a computer-readable medium having a computer-readable program embodied in the medium for implementing a method of using a network system, which comprises a network server, a network client, and a network printer, said computer program product including:

computer-readable program code for sending low-resolution data in an image file to the network client by the network server;

computer-readable program code for performing color matching processing on the low-resolution data by the network client, and displaying a result of the color matching processing on a monitor of the network client when a color matching result is confirmed at the network client; and computer-readable program code for performing color matching processing on high-resolution data in the image file, and sending the color matching processed high-resolution data to the network printer by the network server when image forming is performed by the network printer, wherein the color matching processing is performed on image data using a profile corresponding to an image forming apparatus and a source profile added to the image file, and wherein, when the network client demands image forming processing, the color matching processing is performed and the color matching processed image data is sent to an image forming unit in order to form an image from the color matching processed image data.

9. A network server comprising:

a profile memory storing a plurality of profiles corresponding to devices;

an image database memory storing a plurality of image files corresponding to images, each of the plurality of image files including image data of a different resolution, respectively, for a same image;

a color process module memory storing a color process module;

a communication unit adapted for communicating with a network client and a printer through a network; and a color matching processing unit adapted for performing color matching processing using the color process module and a profile of a device stored in said profile memory, wherein image data having a first resolution stored in said image database memory, the color process module, and the profile of the device stored in said profile memory are downloaded to the network client through the network, wherein the network client performs color matching processing on the downloaded image data using the downloaded profile and the downloaded color process module, and displays a resulting color matching processed image, wherein color matching processing is performed on image data having a second resolution stored in said image database memory using the color process module and the profile of the device stored in said profile memory by said color matching processing unit, and wherein the first resolution is lower than the second resolution.

* * * * *